July 20, 1948.  J. B. NICHOLS  2,445,333
PROCESS OF MAKING REGENERATED CELLULOSE FILMS
Filed Nov. 23, 1944
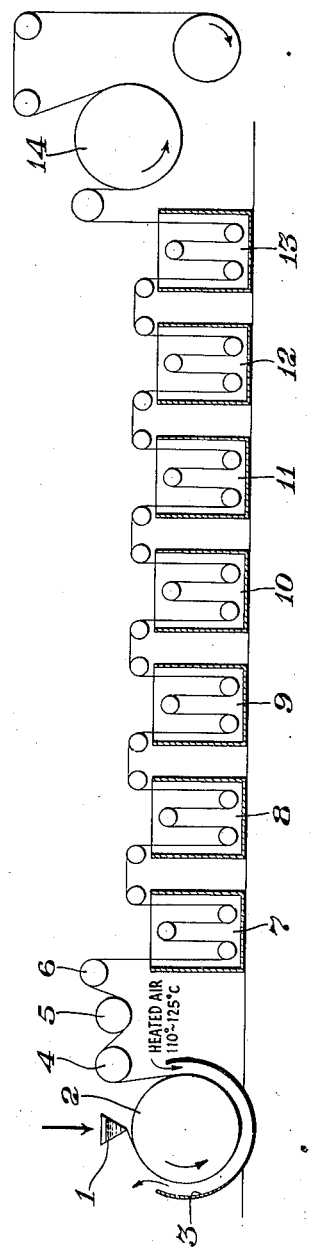
INVENTOR.
James Burton Nichols
BY
ATTORNEY Patented July 20, 1948

2,445,333

UNITED STATES PATENT OFFICE 2,445,333

PROCESS OF MAKING REGENERATED CELLULOSE FILMS

James Burton Nichols, Wilmington, Del., assignor to E. I. du Pont de Nemours & Company, Wilmington, Del., a corporation of Delaware Application November 23, 1944, Serial No. 564,893

6 Claims. (Cl. 18—57)

This invention relates to a process of making regenerated cellulose films.

Regenerated cellulose film, as obtained by the well known wet regeneration process, has achieved outstanding commercial success. Nevertheless, it is not free of certain shortcomings, of which the most serious are relatively poor tear resistance and unsatisfactory durability under conditions of low temperature and low humidity. The latter defect may be at least partially remedied by addition of softening agents to the film but this introduces another problem since moistureproof coatings do not adhere well to the softened film, particularly if it contains a high proportion of softening agent. Another disadvantage of regenerated cellulose film produced by the wet regeneration process resides in its non-uniformity in all three dimensions, the film having less elongation and lower tear resistance in the direction in which tension was applied during formation. The trade has long recognized the need for a regenerated cellulose sheet characterized by high tear resistance, uniformity in all directions, toughness under cold, dry conditions even without a softener, and good anchorage for moistureproof coatings.

Therefore, an object of this invention is to provide a process for making regenerated cellulose films characterized by three-dimensional, random X-ray patterns, substantially uniform tear resistance in all directions and unusual toughness even under severe atmospheric conditions. Other objects will appear hereinafter.

These objects are accomplished, in accordance with this invention, by extruding or casting viscose on a support, evaporating water from the extruded viscose at a rate sufficient to reduce the water content to less than 45% by weight, and preferably to less than 20%, before irreversible gelation takes place, i. e., before the film loses its water solubility, heating the resulting film in a chemically inert atmosphere, e. g., air, at least until irreversible gelation is obtained, i. e., until the film is no longer soluble in water, stopping the heating when regeneration is substantially complete, washing out the soluble salts and drying the film.

The cellulose from which the viscose is prepared is preferably any of the commercially available cotton linters or wood pulps having good resistance to oxidative degradation and sufficiently high degrees of polymerization to be able to retain a degree of polymerization of at least 500 and preferably 550 to 600 glucose units in the viscose. Viscose containing cellulose having a degree of polymerization below 500 (which is normal for making commercial wet-cast cellulose sheets) may be used but the dry-cast films prepared therefrom have a substantially lower durability than films prepared from viscose made from unaged alkalki cellulose having a degree of polymerization of approximately 600. The salt index of the viscose should be above 1.0 and preferably above 2.0. Above this limit the salt index is not critical; however, high salt index viscose yields stronger but hazier films. When viscose having a salt index below 1.0 is used, coagulation occurs and regeneration is completed too early in the drying stage. The use of a small amount of wetting agent in the viscose is desirable as this tends to avoid the formation of pinholes in the film when the viscose is cast on a support.

The operating conditions necessary to obtain regenerated cellulose films of optimum toughness and durability must be carefully controlled. As illustrated hereinafter by the examples, the viscose is extruded onto any suitable support or casting surface at ordinary or elevated temperatures. It is essential, however, that the temperature of the casting surface be held below 120° C. and preferably below 110° C. to avoid premature decomposition of the cellulose xanthate.

Furthermore, it is essential to rapidly reduce the water content of the film to less than 45% and preferably below 20% before sufficient xanthate has been decomposed to produce irreversible coagulation of the cellulose. This point is at approximately 0.15 mol of combined xanthate per glucose unit of the cellulose as measured by iodine titration of the coagulated film after washing out sulfur compounds with cold sodium chloride solution. This can be accomplished only under certain carefully controlled conditions. The preferred expedient for accomplishing this rapid reduction in water content is to force a rapid current of air or other inert gas over the surface of the thin layer of viscose. The rate of circulation of the inert gas over the film must be more than 400 ft./min. (relative to the movement of the film), and to obtain optimum film properties it should be circulated at a rate of more than 1000 ft./min. When the speed of the air current during the dehydration step is less than 400 ft./min., the films produced have lower strength and unsatisfactory clarity.

The time required to dry, i. e., to reduce the initial water content of the viscose films to the desired degree depends on the temperature of the casting support and the temperature, humidity and rate of circulation of the inert gas. With both the support and the circulating gas at ordinary room temperature and a relative humidity of approximately 50% and an air speed of 1000 ft./min. a drying time of 30 minutes is required to reduce the water content of the viscose film to 10-20%. In a hot drum casting process 1-3 minutes are required when the drum temperature is 90°-110° C., the circulating air temperature is 100°-130° C., and the rate of circulation is 1000 ft./min. With intermediate temperatures and air speeds, the time of drying will be between the values just mentioned.

After the viscose film is dried to the degree specified above, the cellulose xanthate film is subjected to further heating to substantially decompose it, i. e., to regenerate the cellulose. This can be done in combination with the drying stage by further heating of the dried film without its removal from the support. However, for practical reasons it is preferred to strip the dried film from the casting support as soon as the cellulose content has reached 30-40% (which is equivalent to a reduction in moisture content to 30-10%). The stripped film is then subjected to higher temperatures to regenerate the cellulose. Temperatures of 100°-150° C. may be used for this step but the range of 130°-150° C. is preferred. Higher temperatures are less desirable because of their greater degrading action on the cellulose, particularly if air is present. Lower temperatures can be used but considerably longer times are required to obtain the necessary decomposition of the cellulose xanthate. The decomposition of the xanthate takes place rapidly at temperatures above 100° C., e. g., only one minute's heating is required when film is subjected to a current of air at 100°-105° C. circulating at 1000 ft./min. This heat regeneration may be obtained by any convenient known means, for example, by exposing the dried viscose film to a hot air current or by passing it over smooth or embossed heated rolls. This stage of the process requires careful adjustment and control of time and temperature of heating to ensure obtaining sufficient xanthate regeneration without excessively degrading the cellulose. A simple test for use in determining whether the cellulose regeneration has been carried far enough is to determine whether a small piece of the film has been made insoluble in water. The amount of degradation may be determined by measuring the cuprammonium viscosity of the regenerated cellulose and calculating the degree of polymerization of the cellulose from these viscosity data. The regenerated cellulose should have a degree of polymerization of at least 300 glucose units.

The dry regenerated cellulose structures are washed and purified by conventional methods. They may be washed free of salts with water, and preferably with dilute acid baths to decompose any residual and insoluble sulfur compounds attached to the cellulose. An ammonium sulfate bath may be used prior to the dilute acid bath to remove salts likely to produce gaseous products in the acid bath which might produce bubbles in the film. If a desulfured product is desired, the purified cellulose structure may be treated by conventional desulfuring baths such as, for example, hot dilute caustic, by ordinary procedures.

The purified and washed films are then dried by customary means, preferably under slight two-dimensional tension, for example, by passing them over heated polished rolls.

In order to more fully explain the nature and illustrate the practice of the invention, the following examples are given. Parts and percentage compositions are by weight unless otherwise indicated.

*Example I*

A viscose solution containing 7% of cotton linters cellulose (reduced in the alkali cellulose stage to a degree of polymerization of 550 glucose units) and 6% of sodium hydroxide and ripened to a salt index of 1.0, is cast on a glass plate and dried in a stream of air at 105° C., circulating at about 400 ft./min., for 12 minutes. Under these conditions the water content of the film is reduced to less than 45% before irreversible gelation takes place and regeneration (i. e., decomposition of the xanthate) is thereafter effected, as evidenced by the retention of a tough, coherent sheet upon immersion in water. After a 4-minute wash in water to remove soluble salts and alkali and to remove the sheet from the support, it is given a 3-minute treatment in an acid bath containing 13% sulfuric acid and 18% sodium sulfate to decompose residual and insoluble sulfur compounds. The sheet is then subjected to two further water washes to remove the acid, desulfurized by treatment in a 0.3% aqueous sodium hydroxide solution at 90° C. for one minute, and finally given two more water washes. The film is then dried at 70° C. on a frame under slight tension. The tearing strength (determined as described in the following paragraph) of the resulting film is 17 grams. Ordinary unsoftened wet-cast cellulose film at the same film thickness (0.00088") has a tearing strength of about 2 grams. The film is noticeably tough and elastic even when wet.

The tearing strength of these regenerated cellulose films is determined on an instrument which is a modification of the Elmendorf paper tester. This tear tester is a force integrating instrument and the tearing strength as determined with it is the force in grams integrated over the distance an initial tear is extended and is reported as the total force in grams required to extend the tear. The instrument is calibrated to give a direct reading of the tearing strength in grams for a 2-inch tear when a standard 0.00088 inch thick test specimen is used. This specimen is cut accurately 2 inches x 2.5 inches and a slit exactly 0.5 inch long is cut at the midpoint of the 2-inch side of the sample with a special pair of scissors. Several specimens are tested and the average strength reported. Films of other thicknesses than the standard 0.00088 inch may be tested by proper adjustment of the tester. The tearing strengths of films of different thicknesses are directly proportionl to the squares of their thicknesses.

*Example II*

A viscose solution of high salt index (6.6) of the same cellulose and alkali composition as that in Example I and containing 0.2% (based on the weight of the cellulose) of a sulfonated oil wetting agent, is cast on a smooth support and dried for 10 minutes in a stream of air at 110° C., circulating at a rate of 1000 ft./min. These heating conditions are sufficient to dehydrate the viscose to a moisture content of about 20% before injurious xanthate decomposition takes place. Substantially complete regeneration then takes place during the latter stage of the 10-minute heating period. The dehydrated, hot-air regenerated cellulose sheet is immersed in 18% ammonium sulfate solution for 3 minutes to remove gas-forming products and then immersed for 3 minutes in a bath containing 4% sulfuric acid and 6% sodium sulfate to decompose residual insoluble sulfur compounds. After further purification as in the preceding example, the film is immersed for 5 minutes in a 6% aqueous glycerol solution to soften it and is then dried at 85° C. in contact with a smooth surface. This film has a tearing strength under ordinary conditions of temperature and humidity of 42 grams, whereas that of softened wet-cast cellulose sheet of the same thickness has a tearing strength of only about 3 grams. Furthermore, X-ray patterns obtained from this film show practically random orientation of the cellulose crystallites in the sheet. The image obtained from the dry-cast film is fuzzier than that obtained from a conventional wet-cast film which indicates less ordered arrangement in the crystallites in the dry-cast film than in ordinary wet-cast films.

*Example III*

This example illustrates the preferred process in which the drying stage is separated from the heat-regeneration stage.

A viscose solution having a salt index of 7.6 and otherwise of the same composition as the viscose solution described in Example II is cast on a smooth surface and subjected to a stream of low-humidity air at room temperature moving at a rate of 1000 ft./min. for a period of 30 minutes. At the end of this time the film is tack-free and contains 35-40% cellulose or 20-10% water. The dry cellulose xanthate film is stripped from the casting support and regenerated by subjecting it to a stream of hot air at 100°-105° C., circulating at a rate of 1000 ft./min., for one minute. The resulting regenerated cellulose film is subjected to the same washing and purifying treatment described in the preceding example. The unsoftened film is dried in contact with a smooth surface at 105° C. The tearing strength of the resulting film is equal in both directions and approximately 10 times that of wet-cast cellulose film of the same thickness (which shows different properties in the two directions, machine direction and transverse direction).

*Example IV*

This example illustrates the preparation of cellulose films by a drum-casting procedure and is to be read with reference to the accompanying drawing wherein is diagrammatically illustrated an arrangement of film-forming apparatus particularly suited for the practice of my invention.

An unaged viscose solution containing 8.5% cellulose (having a degree of polymerization of about 500-550 glucose units) and 6.5% sodium hydroxide and having a salt index of 5.0 is prepared from a commercial wood pulp (Brown hardwood pulp) by customary methods. This solution is cast at room temperature from a hopper 1 onto the polished surface of a heated stainless steel drum 2 (90° C.) rotating at a surface speed of 2.6 ft./min. The drum is enclosed by a jacket 3 which permits the circulation of heated air over the surface of the film. The film is rapidly dried by a current of air at about 110° C. moving over its surface at a speed of approximately 1500 ft./min. As soon as the water content of the film reaches approximately 30%, the sheet is stripped from the drum and the cellulose regenerated by passing the dried film over rolls 4, 5 and 6 heated to 150° C. The washing and purification of this sheet is carried out in the same manner as in the preceding example (i. e., by passing the film successively through an aqueous ammonium sulfate bath 7, an aqueous sulfuric acid-sodium sulfate bath 8, water washes 9 and 10, desulfuring bath 11, water wash 12, and softener bath 13) with the exception that the aqueous 18% ammonium sulfate solution is held at 90° C. The unsoftened film is dried in contact with polished roll 14 at a surface temperature of 100° C. The resulting film, 0.0012" thick, possesses exceptionally good tearing strength and tumbling durability values even though no attempt was made to avoid considerable tension during the wet processing and drying which produced considerable orientation of the cellulose crystallites in the film under the rather drastic conditions of this example. When tested for durability by the method described in U. S. Patent 2,279,339, this film was found to have durability values of 372 at 75° F., 35% R. H., 122 at 0° F., 35% R. H., and 72 at 85° F., 7% R. H. Corresponding values obtained with unsoftened wet-cast cellulose film of 0.00088" thickness are: 20-30 at 75° F., 35% R. H., 1 at 0° F., 35% R. H., and 1 at 85° F., 7% R. H. These values would not be appreciably higher at a film thickness of 0.0012".

The regenerated cellulose films produced by the process of this invention are characterized by high tearing resistance and toughness under extreme conditions of temperature and humidity, even when they are not softened. However, for some purposes it may be desirable to incorporate a softener in the film. In these cases the film may be softened with conventional cellulose softeners such as glycerol, in the customary manner.

The superior properties of films produced by this process in its preferred embodiments in comparison with representative wet-cast cellulose films are shown in the following table. Both types of film described are of the standard thickness of 0.00088".

TABLE I

*Comparison of properties of dry-cast cellulose film with those of ordinary wet-cast films*

| Property | Wet-cast Films | | | | Films Dry-cast by Process of This Invention | | | |
|---|---|---|---|---|---|---|---|---|
| | Unsoftened | | Softened with 15% Glycerol | | Unsoftened | | Softened with 15% Glycerol | |
| | MD[1] | TD[2] | MD | TD | MD | TD | MD | TD |
| Tear Resistance at 75° F., 35% R. H. in grams | 1.5 | 2.0 | 2 | 4 | 36 | 34 | 31 | 31 |
| Tumbling Durability at— | | | | | | | | |
| 75° F., 35% R. H. | 20–30 | | 70 | | 350–700 | | | |
| 0° F., 35% R. H. | 1 | | 5–15 | | 250 | | | |
| 85° F., 7% R. H. | 1 | | 3–15 | | 250 | | | |
| 0° F., 7% R. H. | 1 | | 1 | | 100 | | | |
| Percent Swelling in Water | 1 | 5 | 1 | 5 | 20 | 20 | | |
| Anchorage of Coating | Fair | | Fair | | Good | | Good. | |
| X-Ray Orientation | Planar, with some uniaxial. | | Planar, with some uniaxial. | | Random | | Random. | |

[1] MD=machine direction.
[2] TD=transverse direction.

A major difference between the dry-cast films of this invention and the wet-cast films of the art lies in the fact that the dry-cast film is formed under essentially random (tensionless) conditions during casting and regenerating, whereas the wet-cast film is subjected to rather considerable machine-direction tensions during its first very plastic stage. As a consequence of its tensionless treatment during the early stages, the dry-cast film may be subjected to severe tensions in the subsequent stages of wet processing and drying without substantially losing its desirable properties, i. e., it retains a high, though less uniform, tear resistance and good toughness under extreme atmospheric conditions.

While the invention has been described particularly from the standpoint of production of films or sheets, it is equally applicable to the preparation of filaments, fibers or other shaped articles.

In view of the high durability and tearing strength, even in very thin sheets, for example 0.0005" thick, and without softener, the dry-cast cellulose sheets obtainable by the present invention are particularly useful for heavy duty wraps of all kinds, such as, for example, for wrapping heavy machine parts having sharp corners and for dried vegetable packages and textile wraps which normally become embrittled by softener transfer from the film to the fabric or contents. It is also useful for inexpensive shower curtains and single use shower capes. Because of the better anchorage of moistureproof coating to the dry-cast film in comparison with ordinary softened cellulose film, the film of this invention is used where good waterproofness is needed, such as, for example, in tablecloths, aprons or floor coverings. These films are also useful in applications where good sewing properties such as seam strength are required. Since the dry-cast films also have greater elasticity when wet than ordinary cellulose films, they are particularly useful for packing meat, especially as casings for sausage, etc. Other uses include their lamination with other materials in thin sheets for extra heavy duty or for special applications requiring imperviousness to gases.

Since it is obvious that various changes and modifications may be made in the invention above described without departing from the nature and spirit thereof, it is to be understood that the invention is not to be restricted except as set forth in the appended claims.

I claim:

1. A process for preparing films of regenerated cellulose from viscose which comprises extruding viscose on a support to form a viscose film, drying the film to a water content of less than 45% by weight before the film has lost its solubility in water, said drying being accomplished by subjecting the film to the action of a stream of inert gas moving at a speed of at least 400 ft./min. relative to the film, said inert gas being at a temperature between ordinary room temperature and 130° C., and regenerating the cellulose by heating the dried film in an inert atmosphere until regeneration is substantially complete, said extruding, drying, and regeneration being accomplished under substantially tensionless conditions whereby to form a tough, tear-resistant regenerated cellulose film having substantially uniform strength in all directions and further characterized by having the micelles in random distribution.

2. A process for preparing films of regenerated cellulose from viscose which comprises extruding viscose on a support to form a viscose film, drying the film to a water content of less than 45% by weight before the film has lost its solubility in water, said drying being accomplished by subjecting the film to the action of a stream of inert gas moving at a speed of at least 400 ft./min. relative to the film, said inert gas being at a temperature between ordinary room temperature and 130° C., and regenerating the cellulose by heating the dried film in an inert atmosphere at a temperature of 100–150° C., until regeneration is substantially complete, said extruding, drying, and regeneration being accomplished under substantially tensionless conditions whereby to form a tough, tear-resistant regenerated cellulose film having substantially uniform strength in all directions and further characterized by having the miscelles in random distribution.

3. A process for preparing films of regenerated cellulose from viscose which comprises extruding viscose on a support to form a viscose film, drying the viscose film to a water content of less than 20% by weight before the film has lost its solubility in water, said drying being accomplished by subjecting the film to the action of a stream of inert gas moving at a speed of at least 1000 ft./min. relative to the film, said inert gas being at a temperature between ordinary room temperature and 130° C., and regenerating the cellulose by heating the dried film in an inert atmosphere at a temperature of 100–150° C., until regeneration is substantially complete, said extruding, drying, and regeneration being accomplished under substantially tensionless conditions whereby to form a tough, tear-resistant regenerated cellulose film having substantially uniform strength in all directions and further characterized by having the miscelles in random distribution.

4. A process for preparing films of regenerated cellulose from viscose which comprises extruding viscose having a salt index above 1.0 and wherein the cellulose has a degree of polymerization of at least 500 glucose units, on a support to form a viscose film, drying the film to a water content of less than 45% by weight before the film has lost its solubility in water, said drying being accomplished by subjecting the film to the action of a stream of inert gas moving at a speed of at least 400 ft./min. relative to the film, said inert gas being at a temperature between ordinary room temperature and 130° C., and regenerating the cellulose by heating the dried film in an inert atmosphere at a temperature of 100–150° C., until regeneration is substantially complete, said extruding, drying, and regeneration being accomplished under substantially tensionless conditions whereby to form a tough, tear-resistant regenerated cellulose film having substantially uniform strength in all directions and further characterized by having the miscelles in random distribution.

5. The process of claim 4 wherein the viscose has a salt index above 2.0 and the cellulose thereof has a degree of polymerization within the range of 550–600 glucose units.

6. A process for preparing films of regenerated cellulose from viscose which comprises extruding viscose having a salt index above 1.0 and wherein the cellulose has a degree of polymerization of at least 500 glucose units, on a support to form a viscose film, drying the viscose film to a water content of less than 20% by weight before the film has lost its solubility in water, said drying being accomplished by subjecting the film to the action of a stream of air moving at a speed of at least 1000 ft./min., relative to the film, said air being at a temperature between ordinary room temperature and 130° C., and regenerating the cellulose by heating the dried film in air at a temperature of 100–150° C., until regeneration is substantially complete, said extruding, drying, and regeneration being accomplished under substantially tensionless conditions whereby to form a tough, tear-resistant regenerated cellulose film having substantially uniform strength in all directions and further characterized by having the miscelles in random distribution.

JAMES BURTON NICHOLS.

REFERENCES CITED

The following references are of record in the file of this patent:

UNITED STATES PATENTS

| Number | Name | Date |
|---|---|---|
| 1,576,531 | Mendel | Mar. 16, 1926 |
| 1,864,244 | Henderson | June 21, 1932 |
| 1,937,836 | Morse | Dec. 5, 1933 |
| 2,144,356 | Alles | Jan. 17, 1939 |
| 2,284,028 | Ubbelohde | May 26, 1942 |

FOREIGN PATENTS

| Number | Country | Date |
|---|---|---|
| 394,714 | Great Britain | July 3, 1933 |
| 412,798 | Great Britain | July 5, 1934 |
| 728,682 | France | Apr. 18, 1932 |